A. VAN RENSSELAER.

CONTAINER.

APPLICATION FILED NOV. 17, 1920.

Reissued May 2, 1922.

15,347.

2 SHEETS—SHEET 1.

INVENTOR.

Allen Van Rensselaer,

By Graham & Harris

ATTORNEYS.

A. VAN RENSSELAER.

CONTAINER.

APPLICATION FILED NOV. 17, 1920.

Reissued May 2, 1922.

15,347.

2 SHEETS—SHEET 2.

INVENTOR.

Allen Van Rensselaer,

BY Graham & Harris

ATTORNEYS.

UNITED STATES PATENT OFFICE.

ALLEN VAN RENSSELAER, OF LOS ANGELES, CALIFORNIA.

CONTAINER.

15,347. Specification of Reissued Letters Patent. Reissued May 2, 1922.

Original No. 1,285,383, dated November 19, 1918, Serial No. 187,158, filed August 20, 1917. Application for reissue filed November 17, 1920. Serial No. 424,797.

*To all whom it may concern:*

Be it known that I, ALLEN VAN RENSSELAER, a citizen of the United States, residing at Los Angeles, in the county of Los Angeles and State of California, have invented a certain new and useful Improvement in Containers, of which the following is a specification.

My invention is particularly adapted for the storing of gasoline or light oils under water.

An object of my invention is to provide means for storing such oils under pressure.

My invention comprises a container divided by a partition into a lower and upper chamber, the oil to be stored being carried in the lower chamber and the upper chamber being used as a water reservoir.

An object of my invention is to regulate the amount of water in said upper chamber to maintain a substantial equilibrium of pressures on said partition.

Further objects and advantages will be made evident hereinafter.

Referring to the drawing which is for illustrative purposes only,

Figure 1:
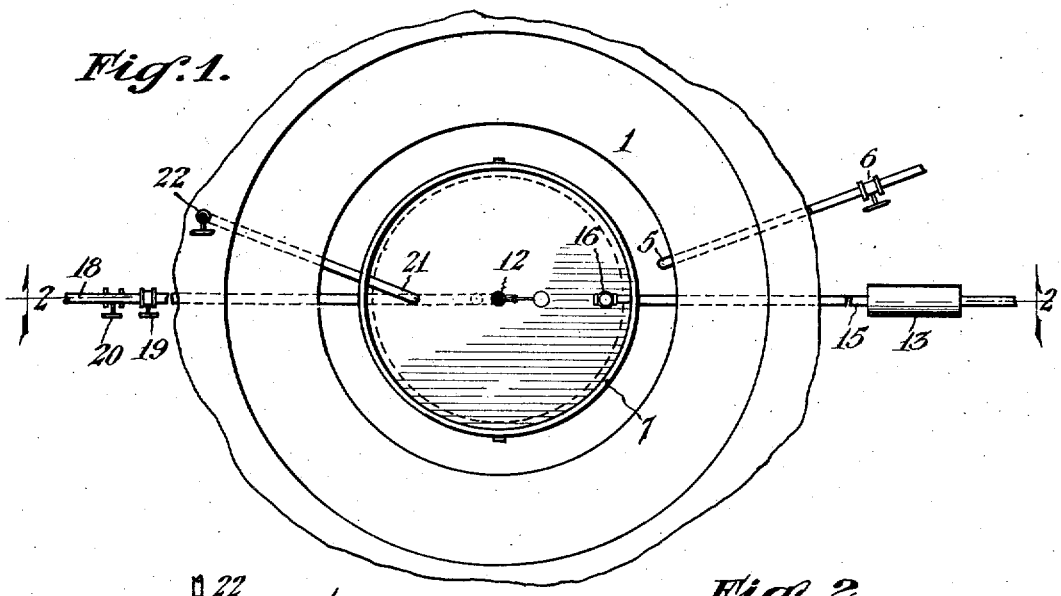
Fig. 1 is a plan view of one form of my invention.

In these figures, 1 indicates a basin which may consist of the lower and relatively small portion 2 and the upper and relatively large portion 3. The form of basin 1 shown need not necessarily be adhered to, being simply a convenient and economical one. A pipe 5 leads from any source of water supply by which the basin may be filled; this pipe being provided with a valve 6. The container may consist of a cylindrical shell 7 which is spaced from the bottom of the basin by means of blocks 8.

A partition 9 divides the interior of the container into an upper chamber 10 and a lower chamber 11 whch acts as a storage receptacle for the oil to be stored. The partition 9 may have an outlet port which may be closed by a float valve 12 which will be hereinafter described. The upper chamber 10 forms an equalizing reservoir, the bottom of which is formed by the partition 9. A pump 13 is arranged to draw water from the basin 1 through a pipe 14, and to deliver it to the upper chamber 10 of the container through a pipe 15. An equalizing valve 16 to be hereinafter explained is located in the upper chamber. The liquid to be stored is introduced into the lower chamber through a pipe 17 controlled by a valve 18 and this liquid may be withdrawn through the pipe 19 which is provided with a valve 20. A gas outlet pipe 21 having a valve 22 is provided for discharging air or gas from the lower chamber 11 of the container.

Figure 5:
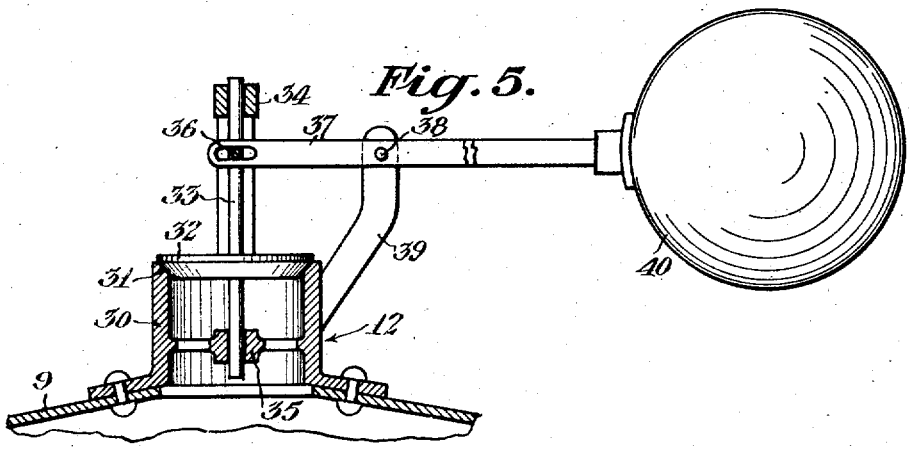
Fig. 5 is a section through one embodiment of the float valve and Fig. 6 is a view at right angles to Fig. 5 of the same valve.
Figure 6:
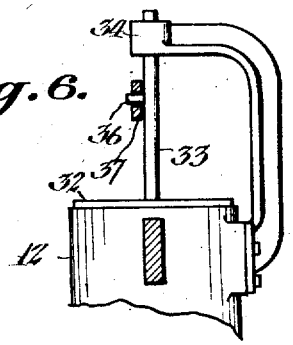

The float valve 12 may be of any convenient form, that shown in Figs. 5 and 6 being one commonly employed for this purpose. In the form shown in this drawing, a casting 30 is secured to the partition 9, this casting terminating in a valve seat 31 on which a valve 32 may be seated. The valve 32 is carried on a valve stem 33 which is provided with guides 34 and 35. A pin 36 in the valve stem 33 is engaged by a slot in a lever 37 pivoted at 38 on a bracket 39, this lever being operated by a float 40. The float valve 12 operates to close the opening through the casting 30 whenever there is sufficient liquid in the upper chamber of the container to raise the float 40. Float valves of this type are in common use and the specific construction thereof is, therefore, unimportant.

Figure 4:
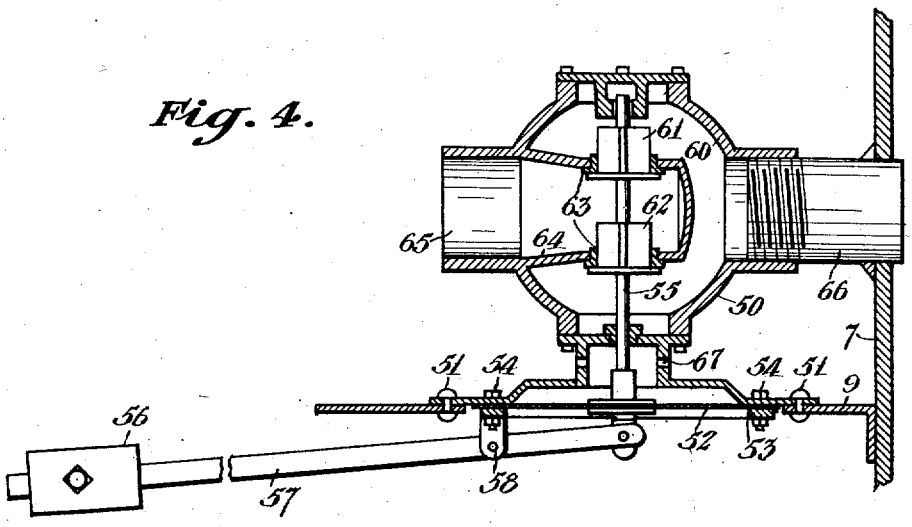
Fig. 4 is a section through one embodiment of regulating valve.

The pressure relief valve 16 is also in common use and is illustrated in Fig. 4 in which a casting 50 is secured to the partition 9 by rivets 51; this casting 50 having a diaphragm 52 secured thereto in gas tight relationship by means of a ring 53 and bolts 54. Secured to the center of the diaphragm 52 is a valve stem 55 which is normally pressed upwardly with, however, a very slight pressure by means of a counter weight 56 carried on an arm 57 pivoted on a bracket 58. The valve stem 55 extends upwardly into the interior of a valve body 60, the stem 55 carrying two valves 61 and 62 which seat in openings 63 formed in a partition 64 in the valve body 60. Water may be admitted to the interior of the valve body through an inlet opening 65, this water passing through the openings 63 when the valves 61 and 62 are unseated and outwardly through a pipe 66 through the wall 7 of the container. Whenever the pressure on the under side of the roof 9 is substantially equal to the pressure on the top of this roof, the valves 61 and 62 are held seated by the weight 56. Whenever for any reason the pressure on the top of the container exceeds that underneath by a certain predetermined amount, this pressure acting through holes 67 on the top of the diaphragm 52 forces this diaphragm down and unseats the valve 61 and 62 allowing water to escape from the chamber 10.

Figure 2:
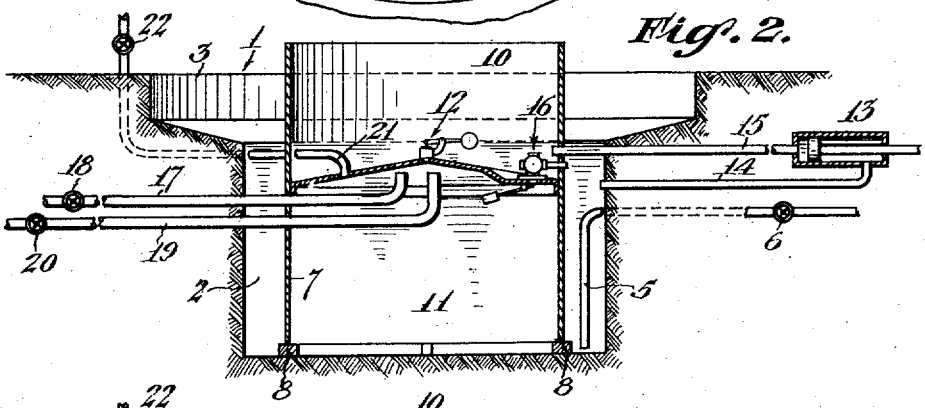
Fig. 2 is a section on a plane indicated by the line 2—2 of Fig. 1 with the lower chamber filled with water and prepared to receive the oil stored.
Figure 3:
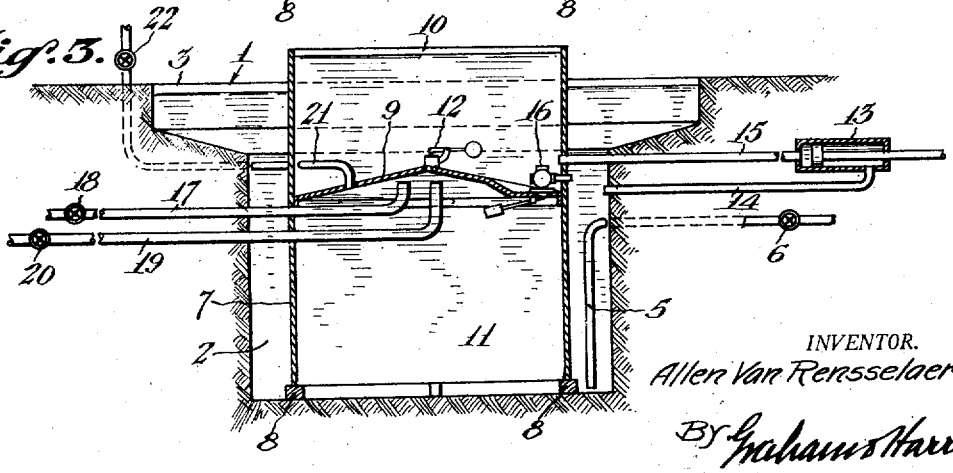
Fig. 3 is a similar view with the lower chamber partially filled with oil.

The method of operation of the embodiment of my invention shown is as follows:

The basin 1 being filled with water, this water rises inside the container due to the fact that the float valve 12 is open. The basin being filled with water to the level shown in Fig. 2, the container is ready to receive the charge of oil or gasoline. To fill the lower chamber with oil or gasoline, the pump 13 is started so there is a constant stream of water flowing into the upper chamber. As soon as sufficient water accumulates on the partition 9 to over-balance the pressure on the under side of this roof, the pressure relief valve 16 opens and this water is allowed to discharge into the basin 1. The float valve 12 being closed due to the presence of water in the upper chamber of the container, oil or gasoline may be introduced through the pipe 17, this oil or gasoline being lighter than the water collects under the partition 9 and forces water out of the container into the basin 1. As the water rises in the basin 1, pressure on the under side of the partition 9 increases but this increase in pressure is compensated for by the water introduced through the pipe 15. The pump 13 must, of course have great enough capacity to supply sufficient water to the upper chamber to compensate for this increase in hydrostatic head. The oil or gasoline is forced into the lower chamber 11 until such a time as the chamber is wholly or partially filled, and during this time the pressure relief valve 16 in combination with the pump 13 maintains a substantial balance of pressures on either side of the partition 9.

When there is any quantity of stored liquid in the lower chamber 11, the level of liquid in the upper chamber 10 must be higher than the level of the water in the basin due to the natural tendency of light oils to float in water. This tendency must be counteracted by the water in the upper chamber if the pressures on the partition are to be substantially equalized. Oil may be withdrawn from the lower chamber 11 through the pipe 19, water flowing in through the bottom of the container to displace the oil. Whenever oil is so withdrawn, the pressure on the under side of the partition 9 decreases and the valve 16 opens and compensates therefor.

It will be noted that by entirely submerging the oil or gasoline in a body of water, I am able to entirely eliminate many of the fire risks now found in storing such materials and particularly I am able to eliminate all danger of fires due to lightning. I am also able to practically eliminate all evaporation. By the peculiar construction adopted, I am able to make tanks of very thin material as the pressure on the partition 9 is at all times equalized, and it need not withstand any appreciable pressures.

I claim as my invention:

1. In a container the combination of, a partition dividing said container into a lower chamber and an upper chamber; means for supplying liquid under pressure to said lower chamber; and means influenced by pressure for regulating the amount of liquid in said upper chamber to maintain a predetermined difference in pressure on either side of said partition.

2. In a container the combination of, a partition dividing said container into a lower chamber and an upper chamber; means for supplying liquid under pressure to said lower chamber; and means influenced by pressure for allowing liquid to flow from said upper chamber to compensate for changes in the pressure on the under surface of said partition.

3. In a container the combination of, a partition dividing said container into a lower chamber and an upper chamber; means for supplying liquid under pressure to said lower chamber; a pipe supplying liquid at a substantially uniform rate to said upper chamber; and means for allowing liquid to flow from said upper chamber to compensate for changes in the pressure on the under surface of said partition.

4. In a container the combination of, a partition dividing said container into a lower chamber and an upper chamber; means for supplying liquid under pressure to said lower chamber; a pipe supplying liquid to said upper chamber; a pressure relief valve; and means for opening said valve whenever the pressure on the top of said partition exceeds the pressure on the under surface of said partition by a predetermined amount.

5. A container the combination of; a basin in which said container is placed, said container having an opening in the bottom thereof; a partition dividing said container into a lower chamber and an upper chamber; means for supplying liquid under pressure to said lower chamber; means for supplying liquid to said upper chamber; and means for allowing liquid to flow from said upper chamber into said basin whenever the pressure on the under side of said partition becomes less than the pressure on the top thereof.

6. In a liquid storage plant, the combination of a container; a partition in said container dividing said container into an upper chamber and a lower chamber; a pipe supplying liquid at a substantially constant rate to said upper chamber; a pipe supplying liquid to said lower chamber; a pipe for withdrawing liquid from the top of said lower chamber; means for allowing gas and air to escape from said lower chamber; a pressure relief valve closing an opening through which liquid may escape from the upper chamber to the space outside the container; pressure operated means open on one side to the pressure of the upper chamber and open on the other side to the pressure of the lower chamber; and means by which said pressure operated means unseats said valve whenever the pressure in the upper chamber exceeds a certain ratio to the pressure in the lower chamber.

7. In a container, the combination of a basin; a container in said basin having an opening in its lower portion providing a free fluid passage between said basin and said container; a partition in said container dividing said container into an upper chamber and a lower chamber; a pipe delivering liquid to said upper chamber; pipe means for supplying and withdrawing the liquid stored in the lower chamber; a pressure relief valve closing an opening through which liquid may escape from the upper chamber to the space outside the container; a pressure operated means open on one side to the pressure of the upper chamber and open on the other side to the pressure of the lower chamber; and means by which said pressure operated means unseats said valve whenever the pressure in the upper chamber exceeds a certain ratio to the pressure in the lower chamber.

8. In a container, the combination of a basin; a container in said basin having an opening in its lower portion providing a free fluid passage between said basin and said container; a partition in said container dividing said container into an upper chamber and a lower chamber; a pipe delivering liquid to said upper chamber; pipe means for supplying and withdrawing the liquid stored in said lower chamber; means for allowing gas and air to escape from said lower chamber; a pressure relief valve closing an opening through which liquid may escape from the upper chamber to the space outside the container; a pressure operated means open on one side to the pressure of the upper chamber and open on the other side to the pressure of the lower chamber; and means by which said pressure operated means unseats said valve whenever the pressure in the upper chamber exceeds a certain ratio to the pressure in the lower chamber.

9. In a liquid storage plant, the combination of a container; a partition in said container dividing said container into an upper chamber and a lower chamber; a pipe delivering liquid to said upper chamber; pipe means for supplying and withdrawing the liquid stored in said lower chamber; a pressure relief valve closing an opening through which liquid may escape from the upper chamber to the space outside the container; a pressure operated means open on one side to the pressure of the upper chamber and open on the other side to the pressure of the lower chamber; and means by which said pressure operated means unseats said valve whenever the pressure in the upper chamber exceeds a certain ratio to the pressure in the lower chamber.

10. In a liquid storage plant, the combination of a container; a partition in said container dividing said container into an upper chamber and a lower chamber; a pipe delivering liquid to said upper chamber; pipe means for supplying and withdrawing the liquid stored in said lower chamber; means for allowing gas and air to escape from said lower chamber; a pressure relief valve closing an opening through which liquid may escape from the upper chamber to the space outside the container; a pressure operated means open on one side to the pressure of the upper chamber and open on the other side to the pressure of the lower chamber; and means by which said pressure operated means unseats said valve whenever the pressure in the upper chamber exceeds a certain ratio to the pressure in the lower chamber.

11. In a container, a partition dividing said container into a lower chamber and an upper chamber; means for supplying liquid under pressure to said lower chamber; and means influenced by pressure for automatically regulating the amount of liquid in said upper chamber to maintain a predetermined difference in pressure on either side of said partition.

12. In a container, a partition dividing said container into a lower chamber and an upper chamber; means for supplying liquid under pressure to said lower chamber; and means influenced by pressure for automatically allowing liquid to flow from said upper chamber to compensate for changes in the pressure on the under surface of said partition.

13. In a container, the combination of a basin; a container in said basin; a partition in said container dividing said container into an upper and a submerged lower chamber, said container having an opening therein providing a free fluid passage between said basin and said lower submerged chamber; and means influenced by pressure of obtaining and maintaining a predetermined difference in pressure on either side of said partition.

14. In a container, the combination of a basin; a container in said basin; a partition in said container dividing said container into an upper and a submerged lower chamber, said container having an opening therein providing a free fluid passage between said basin and said lower submerged chamber; and means influenced by pressure of obtaining and maintaining a definite predetermined excess of unit pressure on the upper side of said partition.

15. In a container, the combination of a partition dividing the container into an upper chamber and a lower chamber, said lower chamber being subjected to a variable pressure in the normal operation of the container; and automatic means influenced by pressure for regulating the volume of a body of liquid in said upper chamber to compensate for said changes in pressure in said lower chamber and thus maintain a substantial equality of pressure on the two sides of said partition.

16. In a container, the combination of a partition dividing the container into an upper chamber and a lower chamber, said lower chamber being subjected to a variable pressure in the normal operation of the container; pipe and valve means for regulating the volume of a liquid carried in said upper chamber; and pressure actuated means for so actuating said means as to maintain a practially constant difference in pressure on the two sides of said partition.

17. In a container, the combination of a partition dividing the container into an upper chamber and a lower chamber, said lower chamber being subjected to a variable pressure in the normal operation of the container; a valve for regulating the volume of a liquid carried in said upper chamber to compensate for said changes in pressure in said lower chamber and thus maintain a substantially constant difference in pressure between the two sides of said partition; and pressure actuated means for so actuating said valve.

18. In a container, the combination of a partition dividing the container into an upper chamber and a lower chamber, said lower chamber being subjected to a variable pressure in the normal operation of the container; a valve for regulating the volume of a liquid carried in said upper chamber to compensate for said changes in pressure in said lower chamber and thus maintain a substantially constant difference in pressure between the two sides of said partition; a pressure actuated member open on one side to the pressure in said lower chamber and on the other side to the pressure of said liquid; and means by which said member actuates said valve.

19. In a container, the combination of a partition dividing the container into an upper chamber and a lower chamber, said lower chamber being subjected to a variable pressure in the normal operation of the container; a valve for regulating the volume of a liquid carried in said upper chamber to compensate for said changes in pressure in said lower chamber and thus maintain a substantially constant difference in pressure between the two sides of said partition; a diaphram member open on one side to the pressure in said lower chamber and on the other side to the pressure of said liquid; and means by which said member actuates said valve.

In testimony whereof, I have hereunto subscribed my name this 8th day of November 1920, at Los Angeles, California.

ALLEN VAN RENSSELAER.